May 26, 1970  R. W. FORSYTH ET AL  3,514,147
CONVERTIBLE CAMPER VEHICLE
Filed Feb. 26, 1968 2 Sheets-Sheet 1
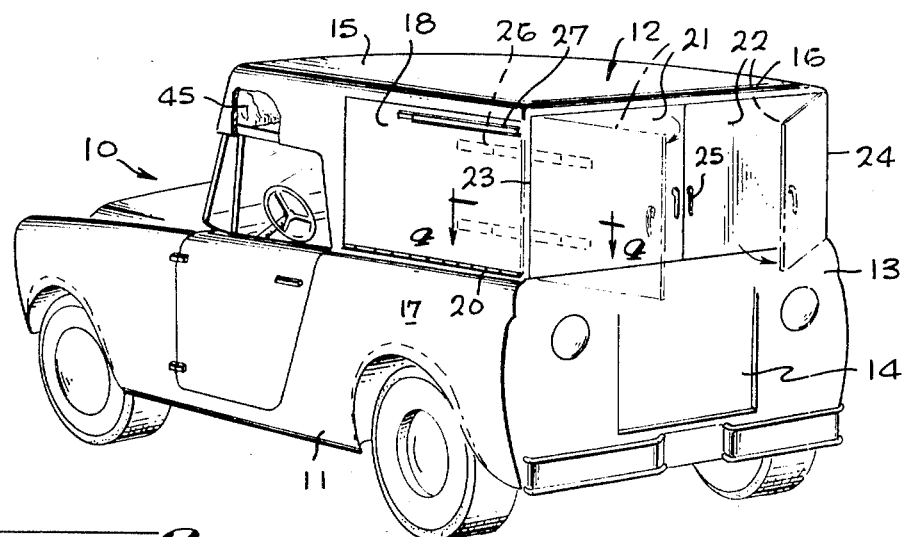
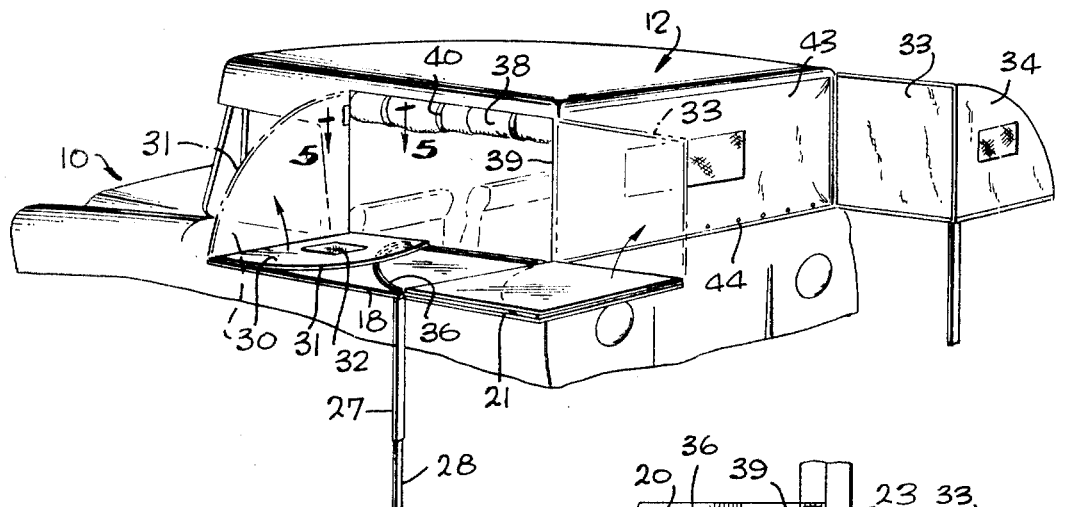
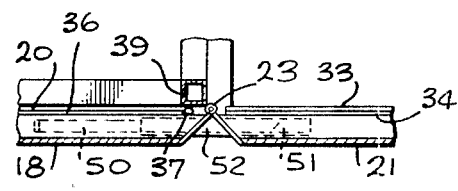
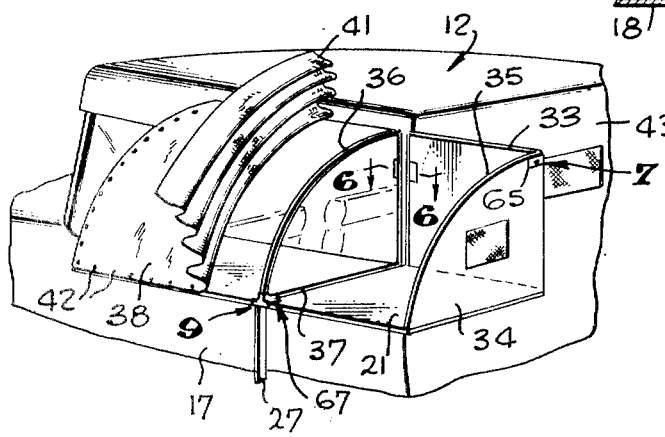
ROBERT W. FORSYTH
JOHN P. FORSYTH
INVENTORS
BY Roger G. Marrs

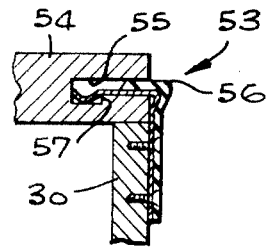
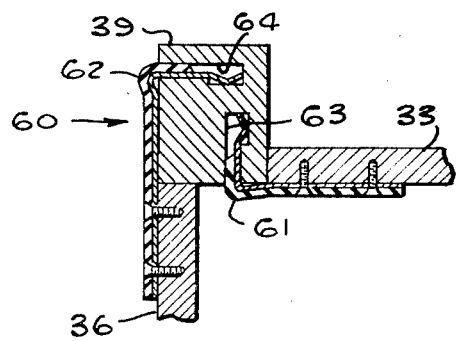
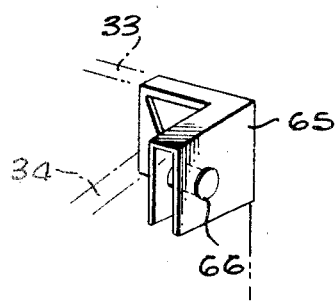
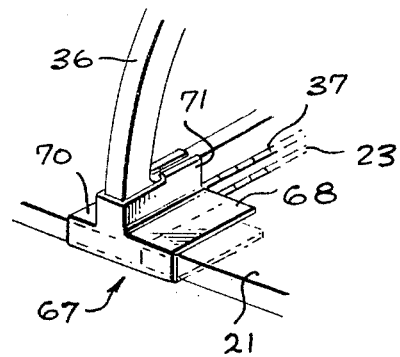
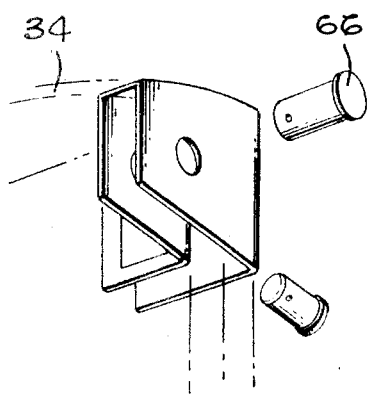
Robert W. Forsyth
John P. Forsyth
INVENTORS
BY Roger A. Marrs

United States Patent Office 3,514,147
Patented May 26, 1970

3,514,147
CONVERTIBLE CAMPER VEHICLE
Robert W. Forsyth and John P. Forsyth, both of 1517 N.
3rd Ave., Upland, Calif. 91786
Filed Feb. 26, 1968, Ser. No. 708,089
Int. Cl. B60p 3/34
U.S. Cl. 296—23
12 Claims

ABSTRACT OF THE DISCLOSURE

The camper vehicle disclosed herein provides a self-contained mobile body having a convertible enclosed living compartment defined by laterally extendable berth panels mounting rearwardly pivoted berth extensions so that in a first roadable configuration, the berth panels and extensions therefor serve as the opposite sides and rear compartment closures and when in a second configuration, the berth panels and extensions constitute a pair of berths longer than the length of the compartment. A foldable cover normally stored in the compartment is deployed over the combined length of each berth panel and extension to enclose the berthing areas when in their second configuration. Foldable upright front and rear section brace means are employed to support the cover over the berth and extension panels while a telescoping pivoting leg supports the extended berth panels when laterally extended.

BACKGROUND OF THE INVENTION

Field of the invention

This invention relates to convertible mobile, recreational and living vehicles and, more particularly, to a novel vehicle having extendable panels defining the living compartment area adapted to provide a pair of berthing areas having an overall length greater than the length of the living compartment and which are selectively formed from the side and rear closure panels of the compartment.

Description of the prior art

A variety of recreational vehicles are currently being employed by campers, hunters, sportsmen, vacationers or the like which combine mobility with living accommodations. A typical vehicle of this class is commonly referred to as a "camper" and utilizes a detachable living enclosure which occupies the open truck bed area of a conventional pick-up truck. Berthing areas extend outwardly over the truck bed sidewalls and an access door is generally provided at the rear of the enclosure. Another version of a camper vehicle or motor home employs a truck frame on which the living enclosure is erected.

However, difficulties have been encountered when employing conventional camper vehicles which largely stem from the fact that the vehicle employs a truck bed or frame which is of a predetermined length and width. The available living enclosure space rearward of the truck cab is relatively limited because of the restricted length of the truck frame so that the length of berthing areas are considerably shorter than normally required to accommodate the full length of a reclining adult. Some attempts have been made to avoid this problem by extending the length of the living compartment or unit beyond the rear limits of the truck frame or truck bed so that the entire length of the living enclosure is increased. Although such construction provides more length for berthing areas, the resulting overhang of the enclosure detracts from the off-the-road capabilities of the vehicle. Furthermore, great stresses are placed on the truck frame inasmuch as the conventional frames are loaded to an extent not compatible with their original design intent.

Other attempts have been made to provide living enclosures or units with full-length berthing areas that include an extendable rear portion of the compartment which telescopes with respect to the main portion so that during travel, the overhang can be eliminated as the vehicle moves and when at rest, the rear portion can be extended to increase the berthing space. Obviously, such extendable compartment portions are relatively complex, expensive and require periodic maintenance. Those conventional vehicles which employ a fixed living compartment or unit thereon, have limited utility in that the vehicles are generally restricted solely to the use thereof as a camper.

SUMMARY OF THE INVENTION

Accordingly, the convertible camper vehicle of the present invention obviates the aforementioned problems and difficulties by providing a camper vehicle having a living enclosure which readily accommodates at least two adults on full-length bunks or berths and still maintains the basic dimensional (envelope) characteristics of the carrier vehicle. The living compartment includes lateral berth panels which may be selectively extended outwardly to provide berthing space wherein an extendable panel carried on the berth panel may be employed to achieve full-length berthing space. In this fashion, the bunk panels not only serve as the sides of the vehicle compartment but by utilizing the extendable portions, these portions may be used as a rear door for the enclosure or compartment.

In one form of the invention, the camper vehicle provides a vehicle body defining a living compartment having outwardly extendable lateral side panels adapted to form a pair of berths when extended. Each berth panel hingeably mounts an end panel adapted to extend the length of the berth beyond the end of the compartment when the berth is in its outwardly extending position and adapted to serve as a half-rear door panel in a second position when the berth side panels are not extended. Cover means are employed to enclose each of the berthing areas while brace means are employed to support the cover over the berth panels. Clamping means are employed to interconnect the bracing means with the berth panels and compartment stanchions so as to stabilize the berthing areas when the berth side panel and end panels are fully extended. A telescoping leg member is pivoted from the underside of the berth side panel which serves to support the berth on the ground so that the weight of a person occupying the berth is distributed.

Therefore, it is among the primary objects of the present invention to provide a lightweight mobile camper body or compartment capable of providing full-length sleeping accommodations with the advantage of little or no rear overhang of the vehicle frame.

Another object of the present invention is to provide a novel mobile camper vehicle having a living enclosure defined by extendable side panels which, when extended, serve as full-length berthing areas by means of extendable end panels wherein the end panels serve as closures for the rear of the compartment when the side panels have not been extended.

Another object of the present invention is to provide a novel mobile camper having a living compartment or relatively short length so that the overall length vehicle dimensional envelope is substantially unaltered while incorporating laterally extending berth panels adapted to serve as berthing areas in one position and compartment closures in a second position and which includes end panels on each of the side panels serving as rear compartment closures when the side panels are not extended and being further adapted to extend the length of the side panels when the side panels are extended.

Yet another object of the present invention is to provide a convertible mobile camper having a first configuration substantially similar to a conventional panel-body truck and a second configuration wherein the sides of the compartment and the rear-half doors of the compartment may be extended as a unitary structure to provide full adult length berthing areas.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a rear perspective view of the novel convertible camper vehicle of the present invention illustrated in its roadable configuration;

FIG. 2 is a view similar to the view shown in FIG. 1 illustrating the camper living compartment partially deployed to provide lateral berthing areas along the sides thereof;

FIG. 3 is a perspective view of the living compartment showing the lateral berths fully extended and partially enclosed by the foldable cover;

FIG. 4 is an enlarged sectional view of the hingeable connection means joining the extendable end panels to the major berth panel as taken in the direction of arrows 4—4 of FIG. 1;

FIG. 5 is a sectional view of a retainer means adapted to detachably retain the forward end section to the vehicle body as taken in the direction of arrows 5—5 of FIG. 2;

FIG. 6 is a cross-sectional view of a clamp means adapted to detachably support the intermediate brace to the vehicle body as taken in the direction of arrows 6—6 of FIG. 3;

FIGS. 7 and 8 are exploded perspective views of a corner clamp employed in the berthing construction for the rear end section as taken in the direction of arrow 7 in FIG. 3; and FIG. 9 is a perspective view of a removable clamp employed to join the intermediate brace with the berth panel and end panel is taken in the direction of arrow 8 in FIG. 3.

DESCRIPTION OF THE PREFERRED EMBODIMENT

Referring to FIG. 1, a light-weight all-wheel drive vehicle is indicated by numeral 10 which includes a rear body portion 11 adapted to mount a living compartment 12. The body 11 may include a rear tailgate 13 or may include an access door or panel 14. The living compartment 12 includes a forward portion 15 which is disposed over the cab or driver's compartment of the vehicle and a rear portion 16 which fits into the open truck bed area of the vehicle defined by opposite side walls 17. As can be seen in the configuration of FIG. 1, the living compartment does not overhang the sidewalls 17 or the rear tailgate 13 so that the original vehicle envelope is not changed. Furthermore, the length of the vehicle truck bed is conventional and is substantially shorter than is required to accommodate a reclining adult lying between the rear of the vehicle cab and the tailgate 13.

Each side of the living compartment is defined by a berth or bunk panel 18 pivotally connected to the upper edge marginal region of each side wall 17 by a hinge 20. The berth panels 18 serves as sides for the compartment and enclose the interior thereof. Suitable latch means may be provided to releasably secure the side panels to the compartment so that the panels will be retained in the closed position as shown. Furthermore, the rear of the compartment 12 is enclosed by a pair of rear panels 21 and 22 representing half-doors which are pivotally connected to the respective rear ends of the side panels 18 by means of hinges 23 and 24. Latch devices 25 are included on each of the rear panels 21 and 22 so that the half-doors may be secured when desired to complete the enclosure of compartment 12. As indicated in broken lines in FIG. 1, the rear door panels 21 and 22 may be pivoted outwardly so as to be coextensive with the side panels 18 whereby the overall length of each berth is increased. When so extended, hidden latching means 26 may be employed to interconnect the side panel with the rear panel so that a single unitary structure is produced. Details of the latching means 26 will be described later with respect to FIG. 4.

Referring now to FIG. 2, the side panels 18 including extended panels 21 and 22 have been deployed so as to extend outwardly from the sides of compartment 12 exposing the interior thereof. To stabilize the extended side panels, a leg member 27 pivotally attached to the underside of the side panel is positioned downwardly into engagement with a supporting surface such as the ground. Leg member 27 includes an extension portion 28 that is arranged in telescoping relationship with respect to the major length of the leg member so as to accommodate uneven terrain. Once the side panel 18 has been connected to the rear half-door panel 21 and lowered to its horizontal position, a forward end panel 30 is raised to the position shown in dotted lines. Forward closure panel 30 is pivotally carried on the forward end of side panel 18 and is provided with an arcuate edge 31 and a screened window 32. The rear panel half-door 21 hingedly mounts a closure panel 33 and a rear closure end panel 34. The rear closure panel 34 includes an arcuate edge 35 which lies in the same curved plane as edge 31 when the respective forward and rear end panels are extended. Closure panel 33 occupies the space between a compartment stanchion 39 and the inside edge of the end panel 34.

Intermediate of the forward and rear end panels 30 and 34, there is provided a centrally open brace member 36 which is curved on its outer edge to conform to the curvature of the arcuate edges 31 and 35. The brace member 36 is pivotally mounted by hinge 37 so that the brace member may be selectively moved into an upright position. It is also to be noted that a cover 38 is folded into a roll which is stored on the inside of the compartment 12 and held in place by a plurality of straps 40.

As shown in FIG. 3, the cover 38 has been released from the straps 40 and deployed over the forward and rear panels 30 and 34 as well as the brace member 36. The cover 38 includes a flap portion 41 adapted to be positioned over the brace member 36 extending to the rear panel 34. Once the cover has been deployed over the berthing area, the edge marginal regions of the cover may be fastened to the peripheral edge of the forward and rear end panels as well as along the outermost edge of the side panel and rear panel 21 by a plurality of snap fasteners such as is indicated by numeral 42. To complete enclosure of the compartment, a rear fabric cover 43 may be unrolled from along the inside rear edge of the compartment and fastened to the tailgate 13 by snap fasteners 44.

Referring now to FIG. 4, an enlarged view of the interlocking means for releasably securing the panel 18 to the rear panel 21 in co-extensive relationship is illustrated. The adjacent ends of the panels are provided with opposing internal and aligned recesses 50 and 51, respectively, through which a latch member 52 is slidably disposed. The latch 52 may be slid into receptacles 50 or 51 when it is desired to pivot end panel 21 with respect to the panel 18. A sufficient length of the latch will protrude from the selected receptacle so that it may be readily grasped by the user's fingers and inserted into the opposite receptacle when it is desired to couple the panels together. Obviously, when the latch 52 is situated as shown in FIG. 4, both panels are secured together against pivoting. The hinge 37 for brace means 36 is clearly illustrated as well as the vertical hinge 23 which permits the panels 18 and 21 to be pivoted with respect to each other. Also, a portion of horizontal hinge 20 is illustrated which permits panel 18 to be laterally extended from the side of compartment 12.

In FIG. 5, clamping means 53 are illustrated for releasably securing forward panel 30 to the compartment. It is to be noted that the forward portion 15 of the compartment includes a side member 54 having a slot 55 formed in its terminating end opening adjacent to the extreme forwar end of panel 18. The end of forward panel 30 includes a spring clip 56 which projects outwardly from the end of the panel and then forwardly in spaced relationship therewith. Therefore, when the forward panel 30 is pivoted to its upright position, the cantilevered end of clamp 56 is insertably received within slot 55 so that the bent end of the clip 56 springs into an enlargement of slot 55 over a shoulder 57. In this manner, spring clip 56 detachably secures the forward panel 30 to the compartment.

In FIG. 6, a clamp means indicated in the direction of arrow 60 is provided for releasably securing brace member 36 to the stanchion 39 as well as one end of panel 33. The clamping means is similar to the clip clamping means 53 shown in FIG. 5 in that panel 33 and brace member 36 include a resilient spring clip 61 and 62, respectively, adapted to be insertably received within slots 63 and 64 formed in the adjacent side walls of the stanchion 39.

In FIGS. 7 and 8, a clamping device 65 is illustrated which is suitable to releasably secure the adjacent ends of panel 33 and rear end panel 34. The clamp 65 is substantially U-shaped in cross-section and includes continuous portions integrally formed at a right angle so that the portions may be slipped over the exposed ends of adjacent corners of panel 33 and 34. To releasably fix the clamp 65 to the corner of the adjacent panels, a pair of pip pins, such as pin 66 may be employed which are insertably received through registered openings in the clamp portions and through a hole in the panels 33 and 34. The holes in the panels are in alignment with the openings in the clamp portions when the clamp is mounted on the corner of the panel.

Referring now to FIG. 9, a clamping device is indicated in the direction of arrow 67 which is adapted to releasably secure the opposing ends of panels 18 and 21 together as well as to couple with the adjacent end of brace means 36. The clamping device includes a portion 68 adapted to engage with panel 21, a portion 70 adapted to engage with panel 18, and an upright portion 71 adapted to engage with the brace member 36. Portions 68 and 70 are in alignment while portion 71 is located inbetween the two first mentioned portions and is arranged perpendicular therewith.

Therefore, from the foregoing, it can be seen that the convertible camper vehicle of the present invention provides a novel means for supplying berthing areas of suitable length to accommodate a reclining adult wherein the berthing areas extend outwardly from the sides and rear of the vehicle so as to substantially extend the length of the berthing areas beyond the normal dimensional limits of the living compartment. In one position, the side panels and rear half-door panels enclose the living compartment so that the overall contour and general dimensional envelope of the vehicle is unaltered whereby the vehicle is extremely roadable. However, when the panels are extended, the living enclosure is amplified to the extent that elongated berthing is provided beyond the dimensional limits of the compartment in its roadable configuration. By employing clamping means, the panels as well as bracing therefor, may be releasably secured together to complete the construction of an extended berthing area. It is to be understood that suitable fabric, rubber or flexible plastic seals may be provided at the juncture of all panels and clamping devices so as to make the living compartment substantially weather-proof and watertight whether the side panels and rear half-door panels are extended or not.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A mobile living compartment adapted to be carried on a vehicle body of standard length comprising:
   elongated compartment sidewalls pivotally mounted on opposite sides of said compartment having a first position or a second position;
   an extension panel pivotally carried on a selected end of each of said sidewalls constiuting a rear half-door when said sidewalls are in said first position and coextensively extending the dimensional length of said sidewalls beyond the standard length of said body at the rear thereof when said sidewalls are in said second position; and
   means detachably connected between each of said coextensive sidewalls and extension panel and said compartment for enclosing each of said coextensive sidewalls and extension panels so that lateral berthing areas are provided on opposite sides of said compartment adapted to accommodate the full length of a reclining adult.

2. The invention as defined in claim 1 wherein said last mentioned means includes forward and rear end panels hingeably carried on the opposite ends of each of said coextensive sidewalls and extension panels adapted to be positioned in a vertical plane perpendicular to said compartment effective to support the opposite ends of said enclosing means.

3. The invention as defined in claim 1 including means for releasably connecting said sidewall panel to said extension panel when said panels are coextensive so that a unitary structure is produced.

4. The invention as defined in claim 1 wherein said last mentioned means includes a fabric cover and means carried on said coextensive sidewall and extension panels for supporting said cover over said berthing areas between said compartment and the outer edges of said coextensive sidewall and extension panels.

5. The invention as defined in claim 4 including means pivotally attached to each of said sidewalls panels midway between the opposite ends of each panel adapted to support and stabilize said sidewall panels in said second position on a supporting surface.

6. The invention as defined in claim 5 including a fabric flap connected along the upper rear edge of said compartment and adapted to enclose the rear of said compartment when said coextensive sidewall and extension panels are in said second position.

7. The invention as defined in claim 5 including a support member pivotally carried on the outside of each of said side panels adapted to stabilize said side panels on a supporting surface when said side panels are in said second position.

8. A convertible camper vehicle including a body having a cab and rearwardly extending spaced sidewalls terminating in a transverse tailgate so as to define an open truck bed comprising:
   a compartment structure carried on said body sidewalls and adapted to occupy said truck bed whereby the dimensional parameters of said structure are within the dimensional limits of said body;
   elongated side panels defining the opposite sides of said structure and pivotally mounted thereon for enclosing said structure in a first position and for outwardly extending therefrom to constitute lateral berthing areas in a second position;

an extension panel pivotally carried on a selected end of each of said side panels adapted to selectively lengthen the longitudinal dimension of said side panels in coplanar relationship therewith when said side panels are in said second position;

means detachably coupled to said combined extended side panels and said extension panels in said second position for enclosing the berthing areas;

the lengthwise dimension of said coextensive and coplanar side and extension panels substantially exceeding the dimension of said compartment structure so that each of said combined side and extension panels will accommodate the full length of a reclining adult; and interlock means slidably carried by said side panel and said extension panel and being selectively positionable to releasably secure said panels together in said coextensive relationship.

9. A convertible camper vehicle including a body having a cab and rearwardly extending spaced sidewalls terminating in a transverse tailgate so as to define an open truck bed comprising:

a compartment structure carried on said body sidewalls and adapted to occupy said truck bed whereby the dimensional parameters of said structure are within the dimensional limits of said body;

elongated side panels defining the opposite sides of said structure and pivotally mounted thereon for enclosing said structure in a first position and for outwardly extending therefrom to constitute lateral berthing areas in a second position;

an extension panel pivotally carried on a selected end of each of said side panels adapted to selectively lengthen the longitudinal dimension of said side panels in coplanar relationship therewith when said side panels are in said second position;

means detachably coupled to said combined extended side panels and said extension panels in said second position for enclosing the berthing areas;

the lengthwise dimension of said coextensive and coplanar side and extension panels substantially exceeding the dimension of said compartment structure so that each of said combined side and extension panels will accommodate the full length of a reclining adult;

foldable cover means detachably secured between said compartment structure and the extended edge of said side panel over each of said berthing areas; and a forward and rear end panel pivotally carried on the opposite ends of said coextensive side and extension panel and each of said forward and rear end panels formed with an arcuate edge extending said compartment structure and the extended edge of said side panel adapted to releasably secure with the opposite edges of said cover means.

10. The invention as defined in claim 9 including brace means pivotally secured to each of said side panels at a location adjacent to its pivotal connection with said extension panel and adapted to support said cover means substantially mid-way between its opposite ends.

11. The invention as defined in claim 10 including a closure panel pivotally carried on each of said extension panels adapted to occupy the space between one end of said brace means and one end of said rear end panel.

12. The invention as defined in claim 11 including clamping means for releasably securing said forward end panel, said brace means and said closure panel to said compartment structure; and detachable clip means for removably connecting said rear end panel to said closure panel and for coupling said side panel, brace means and extension panels together.

References Cited

UNITED STATES PATENTS 3,399,922   9/1968   Burton _____ 296—23

FOREIGN PATENTS 174,813   6/1951   Austria.

PHILIP GOODMAN, Primary Examiner

U.S. Cl. X.R.
52—64; 296—26